Feb. 22, 1966     G. S. WING     3,236,143
BLIND FASTENING DEVICE WITH COLLAPSIBLE TUBE
Original Filed May 15, 1959     5 Sheets-Sheet 1
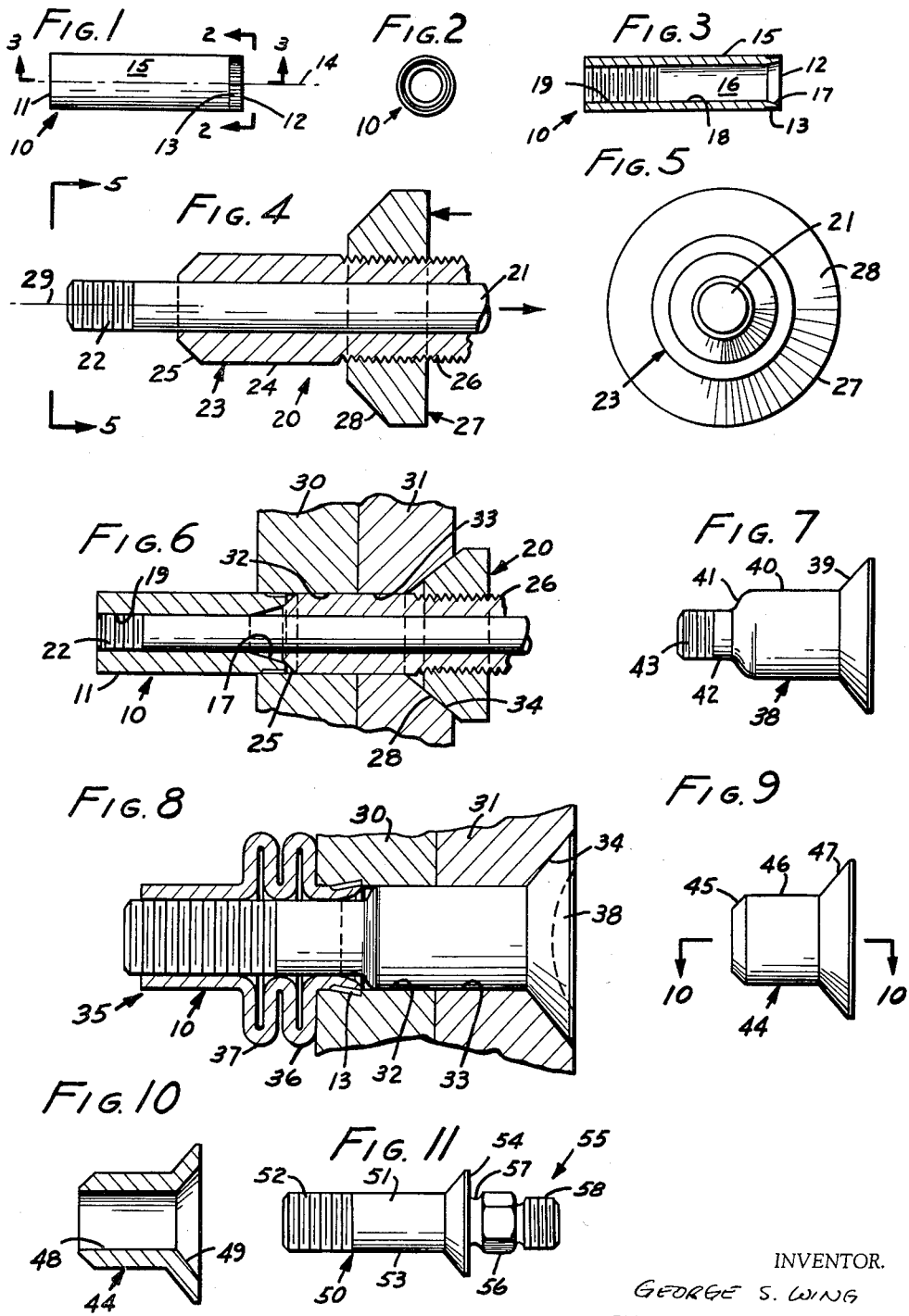
INVENTOR.
GEORGE S. WING
BY
ATTORNEYS.

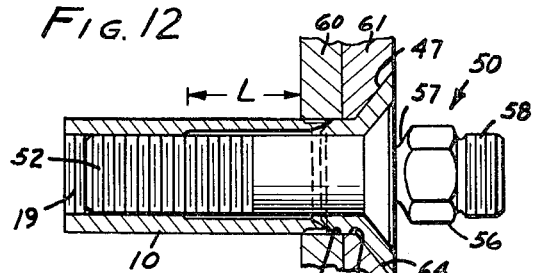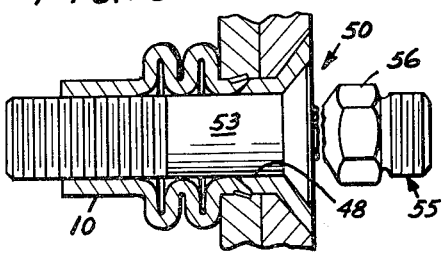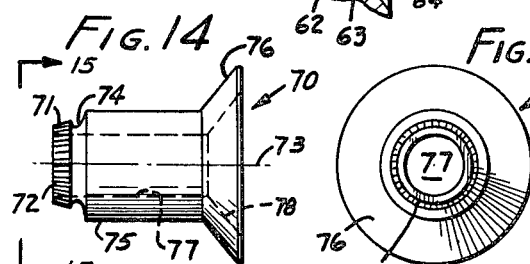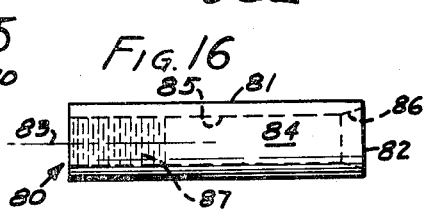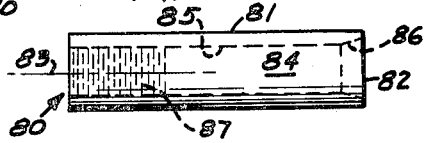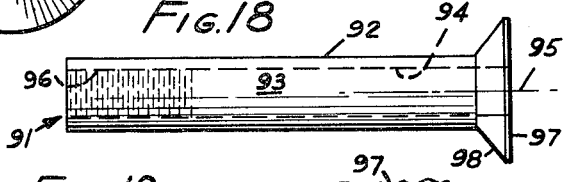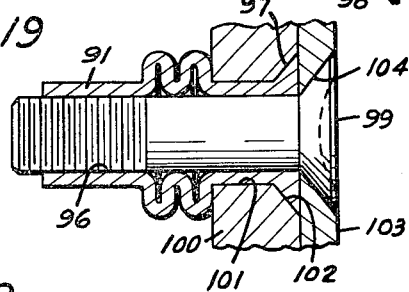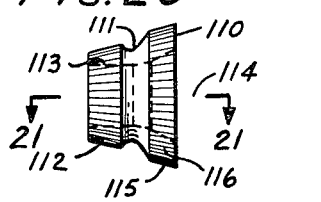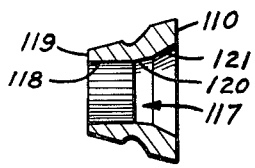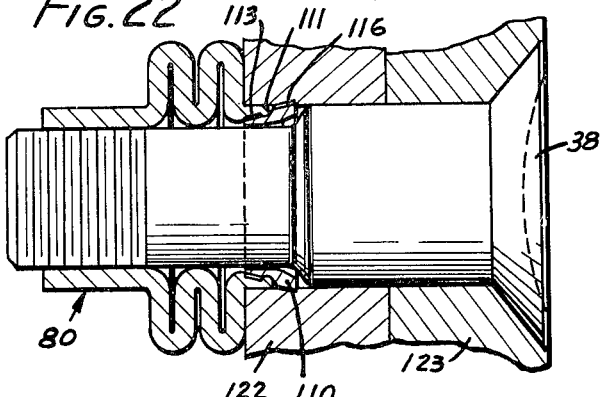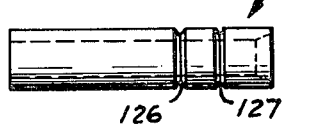

Feb. 22, 1966 G. S. WING 3,236,143
BLIND FASTENING DEVICE WITH COLLAPSIBLE TUBE
Original Filed May 15, 1959 5 Sheets-Sheet 3
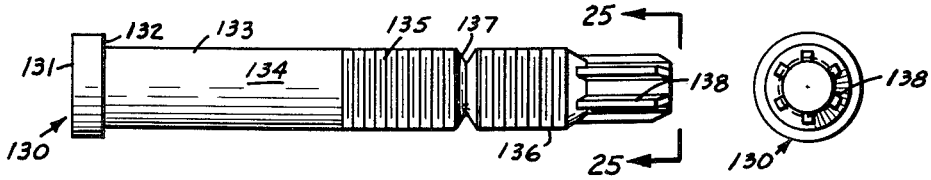
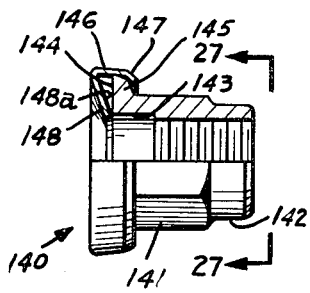
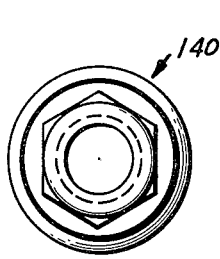
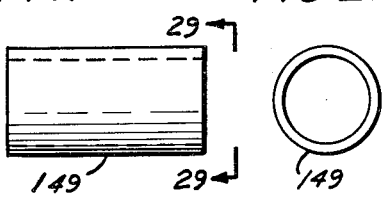
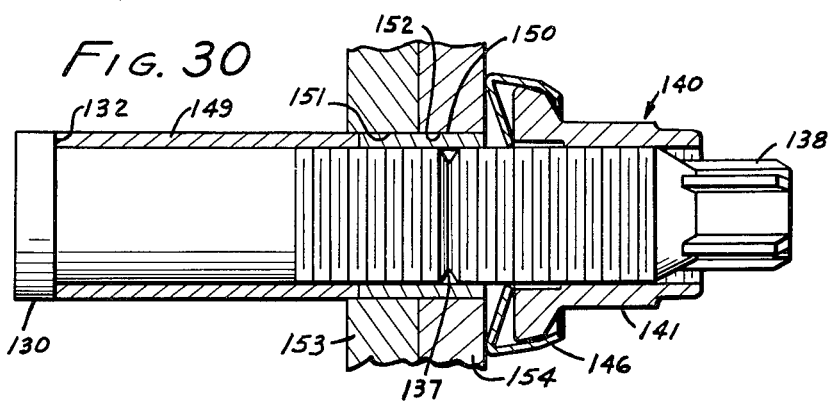
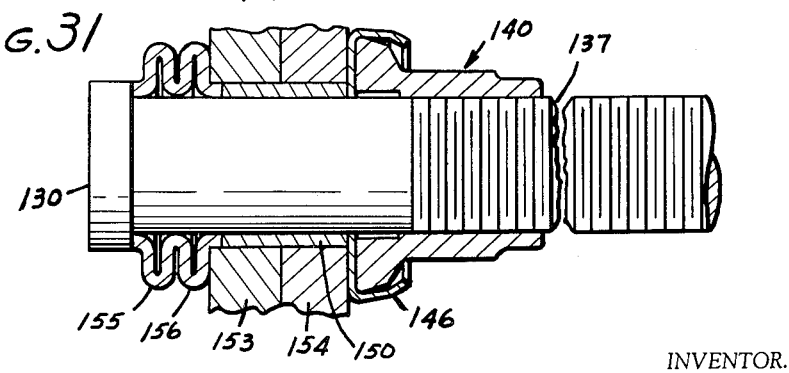
INVENTOR.
GEORGE S. WING
BY
Angus & Mon
ATTORNEYS.

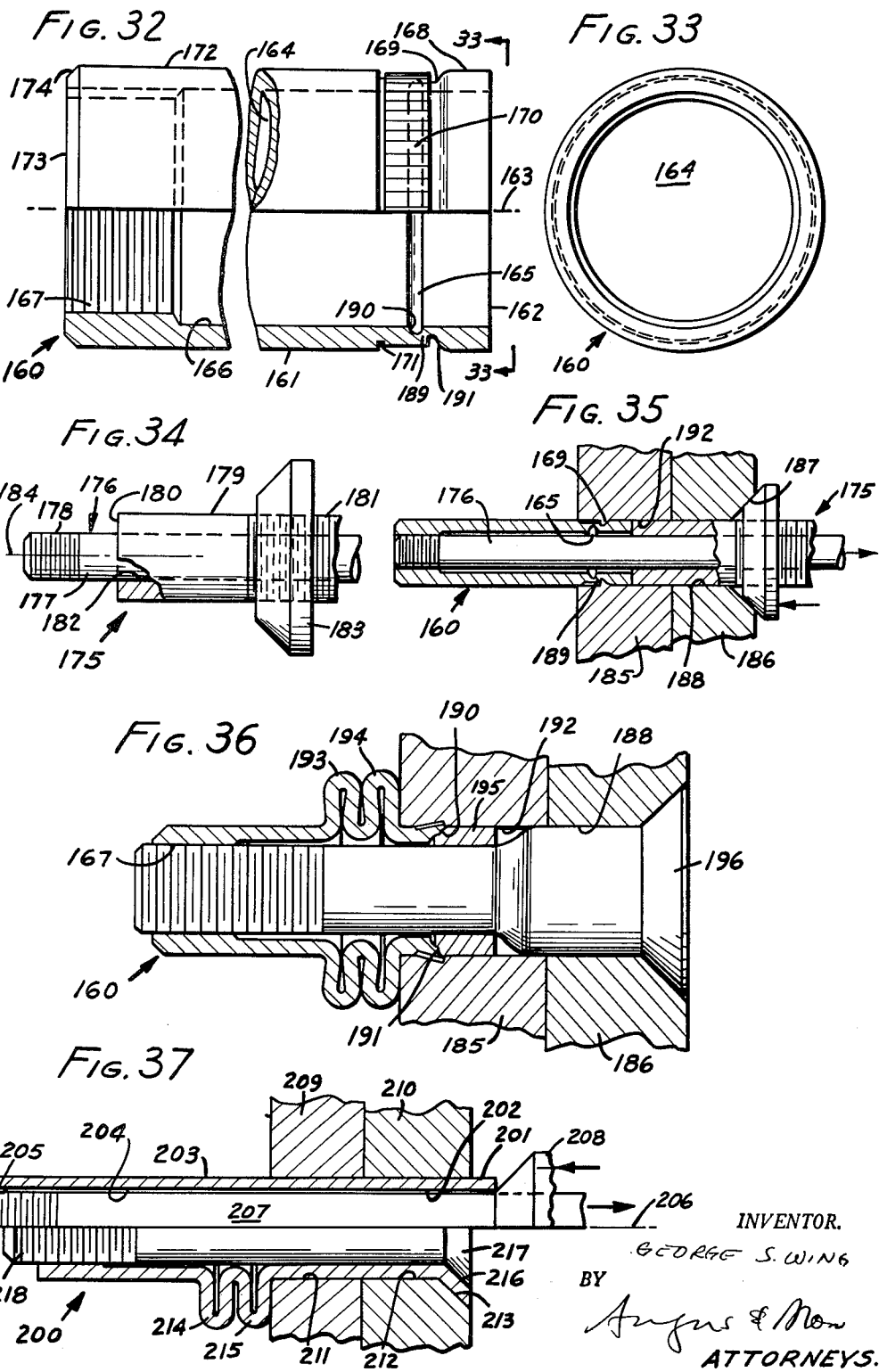

Feb. 22, 1966 G. S. WING 3,236,143
BLIND FASTENING DEVICE WITH COLLAPSIBLE TUBE
Original Filed May 15, 1959 5 Sheets-Sheet 5
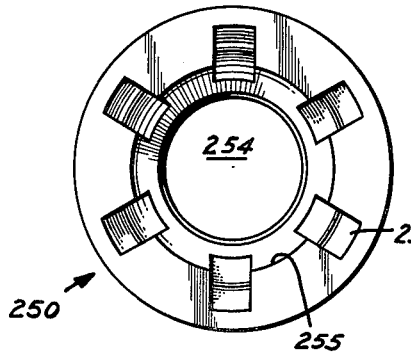
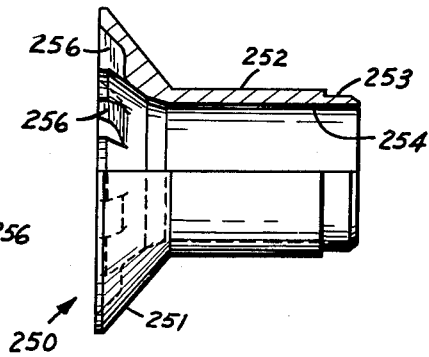
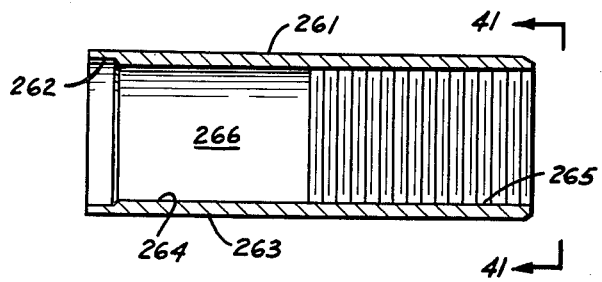
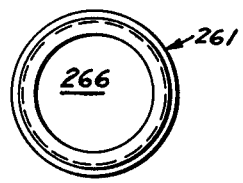
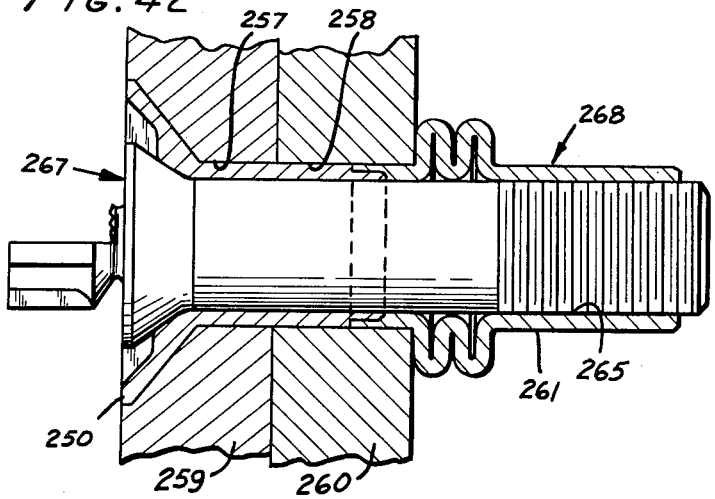
INVENTOR.
GEORGE S. WING
BY
Angus & Mon
ATTORNEYS.

United States Patent Office

3,236,143
Patented Feb. 22, 1966

3,236,143
BLIND FASTENING DEVICE WITH
COLLAPSIBLE TUBE
George S. Wing, Palos Verdes Estates, Calif., assignor to
Hi-Shear Corporation, Torrance, Calif., a corporation
of California
Original application May 15, 1959, Ser. No. 813,536.
Divided and this application Aug. 12, 1964, Ser.
No. 389,173
2 Claims. (Cl. 85—70)

This application is a division of applicant's co-pending patent application, Serial No. 813,536, filed May 15, 1959, now Patent No. 3,181,413, entitled "Fastening Device."

This invention relates to fasteners for joining articles together of the class commonly known as "blind fasteners"; that is, fasteners which can be utilized to assemble joints by operations which can all be performed from the same side of the work.

A common disadvantage of most blind fasteners is that when they are assembled, they are an integral and permanent unit, and the joint they make up cannot be taken apart and reassembled again without destroying the fastener, and setting another one to reassemble the joint.

Still another objection to many blind fasteners is that they have only moderate fatigue resistance, moderate resiliency for withstanding joint vibration, and moderate resistance to shear forces that are developed by axial loads.

It is an object of this invention to provide a blind fastener which is capable of being installed, and then permitting the joint to be assembled and disassembled without destroying the fastener, and without again going through the original steps. An allied object is to provide a simple blind fastener which may readily be installed, which is capable of receiving bolts that closely fit within it to provide a finally-assembled fastener of maximum shear strength, which has sufficient resilience that it can withstand substantial vibration, and which has significant resistance to shear forces imposed by axial loads.

It is a still further object of the invention to provide a fastener which can act as a nut, by means of which a joint may be assembled simply by the insertion of a separate bolt into the permanently retained nut-like blind fastener.

A blind fastener according to this invention includes a tube which has a central axis with an axial hole extending therein from a first end. A first circular cylinder defines a portion of the hole, and a second circular cylinder defines at least a portion of the outside of the tube, these cylinders being coaxial around the central axis, at least a portion of the second cylinder being axially aligned with at least a portion of the first cylinder. There are threads in the wall of the hole on the opposite side of the first cylinder from the said first end, and the ratio of length of the axially opposed portions of the cylinders bear such a ratio to the wall thickness of the tube and to the radii of the cylinders at the axially aligned portions that compressive loading of the axially aligned portions causes the tube to bulge in at least two axially spaced locations, so that when the tube is set by axial compression to form a nut, a double bulge is formed which acts as a bulb on the back side of the work and thereby forms part of a joint-assembly fastener.

A desirable but not essential feature of this invention resides in providing means whereby the first end of the tube may be expanded into the wall of a hole in which the blind fastener is being installed, so that the bulged tube is permanently attached to a workpiece.

Still another desirable but not essential feature of this invention resides in the combination with a tube as defined above, of a threaded mandrel that is adapted to collapse the tube in the aforesaid manner by exertion of axial compressive stress developed by threading a nut on the mandrel, so as to pull on the mandrel, simultaneously restraining the first end of the tube, so a to put the tube into compression.

The above and other features of this invention will be fully understood from the following detailed description and the accompanying drawings, of which:

FIG. 1 is an elevation of the presently preferred embodiment of a fastener according to this invention;

FIGS. 2 and 3 are views taken at lines 2—2 and 3—3, respectively, of FIG. 1;

FIG. 4 is a side elevation, partly in cutaway cross-section, of a tool for setting the fastener of FIG. 1;

FIG. 5 is a view taken at line 5—5 of FIG. 4;

FIG. 6 is a view, partly in cutaway cross-section, showing the tool of FIG. 4 in the first step of installing the fastener of FIG. 1 to a workpiece;

FIG. 7 is an elevation of a shoulder bolt for use in combination with the device of FIG. 1;

FIG. 8 shows an assembled joint utilizing the fastener of FIG. 1 and the bolt of FIG. 7;

FIG. 9 is a side elevation of a portion of another embodiment of the invention;

FIG. 10 is a cross-section taken at line 10—10 of FIG. 9;

FIG. 11 is a side elevation of another portion of the embodiment of the invention to be used with the portion shown in FIG. 9;

FIG. 12 shows a fastener made up of the elements shown in FIGS. 1, 9 and 11 about to be assembled;

FIG. 13 shows the final set fastener developed from FIG. 12;

FIG. 14 is a side elevation of a portion of still another embodiment of the invention;

FIG. 15 is a view taken at line 15—15 of FIG. 14;

FIG. 16 is a side elevation of another portion of the embodiment to be used with the portion shown in FIG. 14;

FIG. 17 is a side elevation, partly in cutaway cross-section, showing a fastener comprising the elements of FIGS. 14 and 16 assembled to a workpiece;

FIG. 18 is a side elevation of still another embodiment of the invention;

FIG. 19 is a side elevation, partly in cutaway cross-section, showing the device of FIG. 18 in its set condition;

FIG. 20 is a side elevation of a portion of still another embodiment of the invention;

FIG. 21 is a cross-section taken at line 21—21 of FIG. 20;

FIG. 22 shows an installed fastener which includes the portion shown in FIG. 20, and the fastener of FIG. 1;

FIG. 23 is a side elevation of a modification of the fastener of FIG. 1;

FIG. 24 is an elevation of a portion of still another embodiment of the invention;

FIG. 25 is an end view taken at line 25—25 of FIG. 24;

FIG. 26 is a side elevation, partly in cutaway cross-section, showing another portion of the embodiment of the invention to be used with the portion shown in FIG. 24;

FIG. 27 is an end view taken at line 27—27 of FIG. 26;

FIG. 28 is a side elevation of still another portion of the fastener to be used with the portions shown in FIGS. 24 and 26;

FIG. 29 is an end view taken at line 29—29 of FIG. 28;

FIG. 30 is a side elevation, partly in cutaway cross-section, showing a fastener comprising the elements of FIGS. 24, 26 and 28 about to be assembled to a workpiece;

3

FIG. 31 is a side elevation, partly in cutaway cross-section, showing the fastener of FIG. 31 in its set condition;

FIG. 32 is a side elevation, partly in cutaway cross-section, showing still another embodiment of the invention;

FIG. 33 is an end view taken at line 33—33 of FIG. 32;

FIG. 34 is a side elevation, partly in cutaway cross-section, of a tool useful in setting the device of FIG. 32.

FIG. 35 shows the fastener of FIG. 32 in the setting tool of FIG. 34 about to assemble a joint;

FIG. 36 is a side elevation, partly in cutaway cross-section, illustrating the fastener of FIG. 32 set in a workpiece;

FIG. 37 is a composite showing, partly in cutaway cross-section, of still another embodiment of the invention, in both its unset and set conditions;

FIG. 38 is an axial cross-section of a portion of still another embodiment of the invention;

FIG. 39 is a left-hand end view taken at line 39—39 of FIG. 38;

FIG. 40 is an axial cross-section of another portion of an embodiment of the invention for use with the portion shown in FIG. 38;

FIG. 41 is a right-hand end view of FIG. 40; and

FIG. 42 is an axial cross-section of a fastener embodiment utilizing the portions of FIGS. 38 and 40, shown in its set condition.

The preferred embodiment of a fastener 10 according to the invention is shown in FIG. 1. This fastener comprises a tube 11. Contiguous to a first end 12 of the tube, the outer surface of the tube has a circumferential axial knurling 13. These axial knurls are longitudinal serrations that are parallel to the axis 14 of the tube, and because the knurls were applied to a circular cylinder, they lie in a cylindrical pattern. The remainder of the exterior surface of the tube is a smooth circular cylindrical surface 15.

Extending from the first end of the tube and preferably, but not necessarily, passing all the way through the tube, there is an inner hole 16 (see FIG. 3). Adjacent and contiguous to the first end 12, and within hole 16, there is a chamfer 17. Continguous to chamfer 17, and defining a portion of hole 15, there is a smooth circular cylindrical surface 18. On the opposite side of surface 18 from the chamfer there are interior threads 19. The crest diameter of the threads is less than the diameter of surface 18, so that a threaded mandrel or other threaded object passed through surface 18 can engage threads 19.

Outer cylindrical surface 15 and inner surface 18 are coaxial, and share axis 18a. At least one portion of each of these cylindrical surfaces is axially aligned with a portion of the other.

There is a critical relationship between the inner and outer diameters of the axially aligned portions of surfaces 15 and 18, respectively, which will be discussed below. This relationship is common to all embodiments of the invention.

In FIG. 4 there is shown a tool 20 useful for setting fastener 10. Tool 20 has a mandrel 21 with threads 22 at one end. The mandrel is axially slidable and is also rotatable within an anvil sleeve 23. Anvil sleeve 23 has a generally cylindrical portion 24 adjacent to a conical nose portion 25. On the other side of the cylindrical portion 24 from the nose portion, there are threads 26. To threads 26 there is threadably engaged an anvil 27 with a conical engaging face 28, which faces in the same direction as nose portion 25. The tool operates to set the fastener by moving anvil 27 and mandrel 21 in axially opposite directions, the mandrel, anvil sleeve, and anvil having a common axis 29.

FIG. 6 illustrates the method of setting fastener 10. Workpieces 30, 31 represent flat plates, or other objects which are to be joined, these workpieces being pierced by holes 32, 33, respectively. Hole 33 may conveniently be countersunk as at 34, for example. The holes are aligned usually by clamping the sheets in a jig or a fixture, and are thereafter ready to receive the fastener.

As can be seen in FIG. 6, the mandrel is axially moved so that threads 22 stand beyond the anvil sleeve, and so that they can be inserted into tube 11 with threads 22 engaged to threads 19. Then, the anvil is axially adjusted by means of turning it on threads 26 so that the anvil is pressed against countersink 34, and the mandrel is pulled back so that the first end of fastener 10 just bears against the nose portion 25 of the anvil sleeve; the fastener is now in a proper initial position.

It will be understood that for workpieces of different individual or total thicknesses, the tool may be adjusted simply by turning the anvil on the anvil sleeve, so as to space nose portion 25 and engaging face 28 a desired distance apart.

The setting process consists of holding engaging face 28 against chamfer 34 and pulling on the mandrel. That will draw chamfer 17 of tube 11 against nose portion 25 of the anvil sleeve. It will be observed that the conical angle of the anvil sleeve is somewhat greater than the conical angle of chamfer 17, the former preferably being approximately a 90° conical angle. The result is that the first end of the tube is flared out as tube 11 is drawn toward the anvil sleeve, and this movement forces the axial knurls to bite into the wall of hole 32. This result can be seen from FIG. 8. At the same time, because the cylindrical portions 15 and 18 where aligned were not engaged by threads of the mandrel, and because of the tube dimensions, the axial compressive loading causes the tube to fail in two locations, so as to form a double upset on the tube. The mandrel may now be unthreaded, and the set fastener, designated by numeral 35 which is fastener 10 deformed and set, is firmly engaged to workpiece 30 with one undulation 36 bearing firmly against the left-hand surface of workpiece 30, and a second undulation 37 bearing firmly against undulation 36.

The fastener designated as 35 now comprises a nut which is firmly attached to workpiece 30. Then a shoulder bolt 38, such as shown in FIG. 7, may be threaded into the set fastener 35. Shoulder bolt 38 has a countersink-type head 39 adapted to fit in countersink 34, and there is a cylindrical portion 40 intended to make a close fit with all of the wall of hole 33, and the major portion of hole 32, so as to fill in the hole and lend maximum shear strength to the joint. A shoulder 41 forms a step down to a neck 42 of reduced diameter which has threads 43 on its end. These threads 43 are threaded into the threads 19 of the fastener, and the shoulder bolt can be tightened down to firmly assemble the joint as shown.

Examination of FIG. 8 will disclose that the shoulder bolt lends a maximum shear strength to the joint, and can receive a torque to provide a calculated axial pre-load for the fastener.

The action of knurls 13 holds the nut against twisting while the bolt is being tightened down, and the pair of undulations 36, 37 provides a resiliency to the joint sufficient to allow the joint to resist vibration forces of a magnitude which cannot be resisted by most blind fasteners.

It will be noted that the joint can be disassembled simply by unthreading and removing shoulder bolt 38, but that fastener 35 will remain in place and available for future use. In the event that fastener 35 is no longer desired, it can be removed simply by knocking it out with a drift pin.

Another embodiment of the invention is made up of a combination of the elements shown in FIGS. 1, 9, and 11. In FIG. 9 an anvil member 44 is shown which is a structure formed in the general shape of a surface of revolution having a nose portion 45 with about a 90° included conical angle, contiguous to which there is a cylindrical section 46. On the other side of section 46 from nose portion 45 there is an engaging face 47. It will be seen that anvil member 44 generally corresponds to the anvil sleeve and anvil of the setting tool of FIG. 4, although in this embodiment it actually forms a part of the fastener itself.

As can best be seen in FIG. 10, the anvil member has an axial cylindrical hole 48 therethrough with a chamfer 49 at its right-hand end. Chamber 49 may be a standard countersink.

FIG. 11 shows a mandrel member 50 which has a shank 51 with threads 52 at its left-hand end relative to FIG. 11. There is a circular cylindrical section 53 immediately adjacent the threads, and on the other side of section 53 from the threads there is a shoulder 54 shaped as a standard countersink head.

On the other side of the head from shank 51 there is a manipulation section 55. The manipulation section comprises a nut 56 attached to shoulder 54 by a section which includes a reduced groove 57. On the other side of the nut from groove 57 there is a plurality of gripping surfaces 58 which are preferably circumferential ring-like grooves adapted to be grasped by a puller (not shown).

FIG. 12 shows a method for installing this embodiment of the fastener. Workpieces 60, 61 have holes 62, 63, respectively, therein. The other end of hole 63 has a chamfer 64. The mandrel member is passed through the hole in the anvil member, and threads 52 are engaged to threads 19 in fastener 10. Then the assembly of mandrel member, anvil member, and fastener, is passed into and through holes 62 and 63 so that engaging face 47 bears against chamfer 64. Then a pulling tool (not shown) is applied to gripping surfaces 58, and the mandrel is pulled while the anvil member is pressed toward the workpieces. The resulting compressive axial loading sets fastener 10 in the same manner as shown in FIG. 8 (see FIG. 13). However, instead of removing the mandrel and replacing it with a shoulder bolt, torque is applied to nut 56 so as to tighten down the mandrel member.

Cylindrical section 53 of the shank makes a close fit with hole 48 in the anvil member so that between them the anvil member and the mandrel member fill in the hole and add to the shear strength of the assembly. The root diameter of groove 57 is calculated so that it will shear in torsion when a proper amount of torque is applied for axially pre-loading the assembled fastener. The manipulation section 55 falls off, thereby giving an indication that the fastener has been set to the desired axial pre-load. This also removes the torsion-applying provision so that the fastener cannot thereafter be tampered with.

Still another embodiment of the fastener involves the elements of FIGS. 14 and 16. FIG. 14 shows an anvil member 70 which has a nose portion 71 that is a conical surface with about a 30° included angle, and is modified by axial knurls 72 which lie in planes that include the central axis 73 of the anvil member. The knurls are inclined toward this axis, and lie in planes common to it. There is a groove 74 immediately adjacent to the knurls, which groove terminates at the knurls on its left-hand side as shown in FIG. 14, and on its right-hand side at a circular cylindrical section 75. On the other side of section 75 from the nose portion, there is an engaging face 76 which is preferably a conical frustum with about a 110° included conical angle.

An axial hole 77 extends from end to end of the anvil member, and at the right-hand end (in FIG. 4), there is a chamfer 78 which also preferably has a 110° included angle.

Anvil member 70 is particularly adapted for use with fastener 80 that is shown in FIG. 16. Fastener 80 differs from fastener 10 only that it does not have external knurls. Briefly, it comprises a tube 81 having a first end 82, a central axis 83, an outer circular cylindrical surface 84, an interior circular cylindrical surface 85 extending from the first end of the tube, a chamfer 86 preferably having an included conical angle of about 30°, and threads 87 adjacent to surface 85, identical to threads 19 of fastener 10.

The installation of an assembly made up of anvil member 70 and fastener 80 is shown in FIG. 17, which shows the device completely set. This assembly may readily be formed either by using the tool of FIG. 4, or by utilizing mandrel member 50, shown in FIG. 11, or it could be set, if desired, simply by exerting torque on a bolt engaged to threads 87. There is shown in FIG. 17 a completed assembly resulting from the use of the tool of FIG. 4. Instead of forcing knurls on the tube into the wall of one of workpieces 88, 89, as in the case of fastener 10, the end of the tube has been deformed so as to pass beyond the knurls 72 on the anvil member, and to be extruded down into groove 74. Resistance to rotation between anvil member 70 and the fastener 80 is obtained by engagement between knurls 72 on the anvil member, and the fastener, and protection against easy separation is provided by the first end of the fastener's hooking over into groove 74 on the anvil member.

The anvil member and the nut are now held together, and are also restrained against relative rotation so that the fastener is substantially unitary, as contrasted to the embodiments described above. A standard bolt 90 is shown threaded into the fastener. It need not be a shoulder bolt, because the anvil member "fills in" the hole to the diameter of the standard bolt whose threads will engage threads 87.

In FIG. 18 there is illustrated still another embodiment of the invention which comprises a fastener 91 that includes an extended tube 92 with a circular cylindrical outer surface 93, and a circular cylindrical inner surface 94 that defines an axial hole passing from end to end of the fastener. The fastener has an axis 95. At the left-hand end in FIG. 18 there are internal threads 96 whose crest diameters are less than the diameter of surface 94. At the right-hand end of the tube there is a head 97 which has an engaging face 98, preferably having about a 110° conical angle. The head of fastener 91 does not have an interior chamfer, because this fastener is principally intended to be a permanently attached nut-like installation, as shown in FIG. 19. It may be set either by the use of the tool shown in FIG. 4, or simply by tightening down on a bolt 99 which is shown inserted therein in FIG. 19. Either way, the collapsing action of fastener 91 is identical to that of fastener 10 as far as the undulations are concerned.

It will be noted that fastener 91 is shown attached only to one workpiece 100. Workpiece 100 has a hole 101 with a countersink 102 therein. The head 97 of fastener 91 fits in the countersink and the fastener makes a flush surface with the right-hand side of workpiece 100. It will therefore be seen that when fastener 91 is installed, it comprises a permanently attached nut on workpiece 100. It could, of course, also be used to attach two workpieces together in the manner such as performed by the fastener in FIG. 17. However, the fastener of FIG. 18 makes provision for the flush attachment of a second workpiece 103 to workpiece 100, using fastener 91 as a nut. Fastener 91 is not as easily removed as fastener 10. To attach workpiece 103, bolt 99 is simply passed through hole 104 and engaged in threads 96 and tightened down, so that workpiece 103 is held to workpiece 100, and the assembly is completed.

Still another embodiment comprises the combination of a retainer member 110 as shown in FIGS. 20 and 21, and fastener 80 of FIG. 16. Retainer member 110 is a generally tapered structure which has an exterior groove 111 disposed adjacent to a frusto-conical nose portion 112. Nose portion 112 has axial knurls 113 thereon. "Axial knurls" are serrations which lie in planes that also include the axis 114 of the retainer member. A second frusto-conical portion 115 is adjacent to and on the other side of groove 111 from nose portion 112, and is also provided with axial knurls 116. Portions 112 and 115 preferably have an included conical angle of about 30°.

Retainer member 110 has a hole 117 (see FIG. 21) extending therethrough, formed by a circular cylindrical portion 118 adjacent a first end 119, a first tapered section 120 and a second tapered section 121, the conical angles of sections 130 and 121 being approximately 20° and 45°, respectively.

The method of installing a fastener utilizing retainer member 110 will be evident from FIG. 22 in which workpieces 122, 123 are shown assembled by an installed fastener assembly. Fastener 80 is shown with a pair of undulations which resulted from its having been upset by axial compression, and it will be seen that by utilizing the tool of FIG. 4 the anvil sleeve has reacted with second tapered section 121 so as to expand it and press knurls 116 into the wall of hole 124 in workpiece 122. The knurls 113 have forced themselves into the inside chamfer 86 of fastener 80 to hold the two bodies against separation. Thereafter a shoulder bolt 38, such as shown in FIG. 7, may be threaded into the fastener.

It will be observed that the retainer member, by virtue of the engagement between the fastener and the groove, holds the fastener firmly, that because of the engagement of one set of its knurls it is restrained against rotation relative to the fastener, and that because of the engagement of its other set of knurls, the entire assembly is held against rotation relative to the workpiece.

FIG. 23 shows a fastener 125 with the same properties as fastener 80 of FIG. 16, with the addition of multiple circumferential ring grooves 126, 127. Occasionally, it is found desirable to place these grooves in the outside surface of the fastener so as to assure that the undulations will be formed at these points by this significant weakening of the outer wall. This groove feature may also be utilized in connection with any of the other fasteners shown in this specification.

FIGS. 24–31 illustrate still another embodiment of the invention. FIG. 24 shows a mandrel member 130 which has a head 131 at one end thereof with a flat annular surface 132 facing toward a shank 133. The shank has a circular cylindrical portion 134 which bears threads 135, 136 at locations spaced from the head. A circumferential groove 137 separates threads 135 and 136.

At the other end of the shank from the head, there are provided axial splines 138 for receiving a torque-applying tool.

FIG. 26 illustrates a nut 140 for use with mandrel member 130. The nut has hexagonal or splined exterior wrench-engaging surfaces 141, a neck section 142 which may, if desired, be pressed out of round for locking purposes, a counterbore 143 adjacent the bearing end 144 of the nut, and a retainer flange 145 also adjacent the bearing end 144. A lubricated washer 146 is held to the bearing end of the nut by a turned-in rim 147 which fits around flange 145. When in its uncompressed shape, the washer has a pair of opposite frusto-conical surfaces 148, 148a, at least one, and preferably both of which, bear a layer (not shown because of its small thickness) of a substantially dry lubricant which preferably comprises a polar wax. The presently-preferred type of lubricant is a polar wax compound, which is substantially dry. One example of this type of compound is sold by S. C. Johnson & Son, Inc., located at Racine, Wisconsin, under the name #153 Wax Lubricant "Tube Draw." This lubricant is provided in an evaporable liquid base. The base evaporates before the lubricant is used as described, leaving the dry wax. A polarized lubricant has been found to be most useful inasmuch as it is very difficult to remove from a surface. Once the above liquid compound has dried, the wax remaining on the treated surface can be removed only by using a strong solvent. There are other suitable dry lubricants that may be baked on or applied electrolytically, or chemical lubricants such as molybdenum disulphide, but the polar wax is preferable by reason of cost and convenience.

A tube 149 (FIGS. 28–29) and a cylindrical spacer (FIG. 30) 150 are also provided, which are major portions of the fastener.

The technique for assembling this fastener is evident from FIGS. 30 and 31. FIG. 30 shows the fastener before it is set. As shown therein, tube 149 and spacer 150 are fitted over the mandrel member with tube 149 bearing against annular surface 132. The fastener is positioned so that spacer 150 fits neatly in holes 151, 152 in workpieces 153, 154. Then, a torque tool (not shown) is engaged to splines 138 and to wrench-engaging surfaces 141, and these are counter-rotated, while pressing the nut toward the workpieces. The effect of this counter-rotation is to press the central portion of washer 146 against workpiece 154, and thereafter to draw the mandrel to the right in FIG. 30 so as to place tube 149 under compression so that it will fail and provide undulations 155, 156, as shown in FIG. 31. Spacer 150 will not fail, because it is side-supported by the workpiece. Stronger application of torque will cause the mandrel member to fail in torsion at groove 137, and assuming the groove to have been cut to correct dimensions, the fact that a proper torque was exerted will be indicated by the failure of the mandrel member. In the event that neck portion 142 of the nut is pressed out of round, it will have been rounded out again by the mandrel member, and the spring-back forces exerted by the neck portion will hold the nut on the mandrel member, and the fastener will be essentially shake-proof.

The lubricated washer standardizes the frictional forces between the nut and workpiece, thereby eliminating these frictional forces as a variable in determining the axial preload as a function of applied torque.

Another embodiment of the invention is shown in FIG. 32. The fastener 160 comprises a tube 161 which has a first end 162. The first end is substantially a flat annulus, and surrounds axis 163 of the tube. An axial hole 164 extends into the tube from the first end thereof. A short space from the first end, there is an interior groove 165 in the interior wall of the tube. Adjacent to this groove there is a smooth circular cylindrical portion 166 which terminates at threads 167. The crest diameter of the threads is less than the diameter of portion 166.

The outer periphery of the tube has, contiguous to its first end, an outer circular cylindrical portion 168, a circumferential groove 169 which is spaced axially slightly to the right of groove 165, a plurality of axial knurls 170, a relief groove 171 contiguous to the knurls, and a circularly cylindrical portion 172 adjacent to the relief. The second end 173 preferably intersects a chamfer 174 in the outer surface.

Parts of cylindrical portions 166 and 172 are axially aligned.

As can best be seen from FIG. 32, the roots of grooves 165 and 169 overlap radially; that is, the root of groove 165 is radially outward of the root of groove 169.

The tool 175 for setting fastener 160 is shown in FIG. 34. This tool comprises a mandrel 176 with a cylindrical portion 177 that has threads 178 at its outer end. An anvil sleeve 179 with a flat annular end 180 has exterior threads 181 and a central bore 182 within which mandrel 176 is slidably and axially fitted. An anvil 183 engages threads 181 so that it can be shifted axially along the anvil sleeve by being turned. The tool has a central axis 184.

The first step in installing fastener 160 is shown in FIG. 35. Workpieces 185, 186 are to be held together. Tool 175 first has attached to its threads 178 a fastener 160, with the mandrel entering hole 164. The anvil is then pressed against a chamfer 187 in hole 188 in workpiece 186, and the mandrel is then pulled in opposition to the anvil.

Web 189 between groove 165 and 169 shears, and the shoulder 190 in groove 165 climbs up on shoulder 191 in groove 169. This causes shoulder 191 to act as an engaging face, and forces knurls 170 radially outward into the wall of hole 192 in workpiece 185 just as the knurls 13 of fastener 10 were forced out in FIG. 8. The portion to the left of groove 169 is thereby firmly attached to workpiece 185, and the tube is collapsed in undulations 193, 194.

A fragment 195 is left free inside hole 192, but this fragment will not ordinarily fall out because of the frictional engagement between the fragment and the left-hand part of the fastener.

The joint is completed by inserting a shoulder bolt 196, which is identical to bolt 38 of FIG. 7, into hole 188 and turning it into threads 167 in the fastener.

In FIG. 37 there is shown still another embodiment of the invention which is similar to the embodiment of FIG. 18, except that its head is formed in the process of setting the fastener. Initially, fastener 200 comprises an elongated tube 201 (upper half of composite FIG. 37).

The tube has a central hole 202 extending from end to end thereof. There are an outer circularly cylindrical surface 203 and an inner circularly cylindrical surface 204 which coincide axially over at least parts of their lengths, and threads 205 are provided in the interior surface adjacent one end of the tube. Surfaces 203 and 204 are coaxial about axis 206. The crest diameter of threads 205 is less than the diameter of surface 204. A mandrel 207 and anvil member 208 are shown in the upper path of composite FIG. 37 ready to set the fastener to join together workpieces 209, 210. The tube is passed through aligned holes 211, 212 in workpieces 209, and 210, respectively, and while pulling on the mandrel the anvil is pressed toward the workpiece. The anvil member then flares out the adjacent end of the tube so that it fits into countersink 213 in workpiece 212, and at the same time upsets the tube so as to form the plurality of undulations 214, 215 shown in the lower portion of composite FIG. 37. As can be seen from this lower portion, the tube with its undulations and flare 216 firmly joins the two workpieces, acting as a hollow rivet. Then after removing the mandrel, a standard bolt 217 can be pushed through the hole so that its head bears against the flare, and its threads 218 engage in the fastener.

FIGS. 38–42 illustrate still another embodiment of the invention. FIG. 38 shows a head member 250 having a countersink head 251 and a shank 252. The shank has a step 253. A central hole 254 extends from end to end of member 250. The head has a countersink 255 in it, and six recesses 256 are sunk in countersink 255 to receive the blades of a driver. As can be seen from FIG. 42, member 250 fits in holes 257, 258 in workpieces 259, 260, and when properly used will extend for the greater portion of the work thickness. It is not collapsed when the fastener is set, and can therefore be made of very strong material. In fact, the material of member 250 can be so strong that it would not collapse in the plurality of undulations if used for the projecting portion of the fastener.

FIG. 40 shows a tube 261 having an interior step 262 which matches step 253. This tube can be brazed to member 250 to make up a fastener substantially identical to the fastener of FIG. 18, except that tube 261 will be made of material ductile enough to collapse in the desired pattern.

The tube includes outer and inner cylindrical, concentric, axially aligned surfaces 263, 264, respectively, and threads 265 in hole 266, the same as tube 10. It is collapsed the same as tube 10 to make a bulb on the back side of the fastener.

A torque tool can be engaged in the recesses to hold the fastener against rotation when a core bolt 267, identical to the core bolt in FIG. 12, is tightened into threads 265 after the fastener is set.

Fastener 268, formed of member 250 brazed to tube 261, makes a device that has optimum strength for those parts which lie within the workpieces, and with optimum properties for being upset by moderate forces and still providing shear strength to withstand axial loads, in the part outside the workpieces.

It will be seen that common to all of the above embodiments, there is a tube which, when compressively, axially loaded, collapses to provide a plurality of undulations which give the advantages enumerated above. Numerous means of utilizing this feature are provided, which give a wide range of types of fasteners for various applications.

It is, of course, necessary to control the ratio between the wall thickness, the strength of the material, the inner and outer diameters of the tube, and the length of tube between the workpiece and the threads that are engaged by the mandrel, in order that the tube will collapse with the multiplicity of undulations. The following empirical relations are of assistance in determining when a tubing of 305 stainless steel will collapse in such a manner:

| Nominal Size | L | D | d | t | L/D | L/d | L/t | D/t |
| --- | --- | --- | --- | --- | --- | --- | --- | --- |
| 5/16″ | .400 | .312 | .266 | .023 | 1.28 | 1.50 | 17.5 | 13.5 |
| 1/4″ | .350 | .250 | .206 | .022 | 1.4 | 1.70 | 15.9 | 11.4 |
| 5/32″ | .230 | .175 | .141 | .017 | 1.31 | 1.63 | 13.5 | 10.3 |

L is the unconfined length of a fastener to be installed. For example, in FIG. 12, L is shown as being the length between the workpiece and threads 19. D is the outer diameter, $d$ the inner diameter, and $t$ the wall thickness of the fastener in this region. The ratios and dimensions may change with materials of different ductility, and there are, of course, materials which are not sufficiently ductile to upset in the illustrated manner. However, the above table of dimensions for one material (305 stainless steel) will serve as a guide in devising suitable dimensions for fasteners using other materials, and also other sizes utilizing the same material.

While the above dimensions are given for tube 11, they will be identical for corresponding portions of the other embodiments of the invention.

A fastener which sets to form two convolutions, or bulges, instead of one, provides several distinct advantages, which include ease in setting the fastener, and substantial resistance to shear developed by axial loads. In order to attain two convolutions on the tube, it is necessary to use a smaller ratio of wall thickness to length than if only one convolution is desired. A thinner wall requires less force to set the fastener, and this is a considerable advantage in installation. A thin wall fastener which is easy to set but has only one convolution when set, has less shear strength between the upset fastener and the workpiece than one which sets to a double convolution. The double convolution increases that shear strength to an adequate level.

This invention is not to be limited by the examples shown in the drawings and described in the description, which are given by way of example and not of limitation, but only in accordance with the scope of the appended claims.

I claim:

1. A blind fastener adapted to fit in a hole in an object comprising: a tube having a central axis, an axial hole extending from a first end thereof, a first circular cylindrical surface defining at least a portion of the hole, a second circular cylindrical surface defining at least a portion of the outside contour of the tube, said cylindrical surfaces being coaxial around the central axis, at least a portion of the second cylindrical surface being axially aligned with at least a portion of the first cylindrical surface, the aligned portions being continuous and ungrooved, and internal threads in the hole on the opposite side of the first cylindrical surface from the first end, the ratio of length of the axially aligned portions of the cylindrical surfaces, the wall thickness of the tube and the radii of the cylindrical surfaces at the axially aligned portions being such that compressive loading of said tube which is exerted by engaging said threads and pulling the tube toward the first end while opposing movement of the first end, causes the tube to bulge outwardly in at least two axially spaced locations included in the axially aligned portions of the cylindrical surfaces; and a retainer member including a pair of frusto-conical portions separated by a groove, both of said frusto-conical portions bearing axial knurls, both knurls lying sloped relative to the atxis, the greatest diameter of both being less than the outer diameter of the tube facing the retainer member, the knurl lying closer to the tube when the knurls face the tube having smaller diameters than the diameters of that knurl which lies farther from the tube, the retainer member having an axial hole extending therethrough, and a tapered wall section partially bonding the axial hole in the retainer member for engagement by an anvil member whereby the anvil member will, when pressed against it, expand the larger end of the retainer member into the wall of the hole in the object, and whereby compression of the tube and retainer caused by pulling on a mandrel engaged to the threads in the tube in opposition to force exerted on the retainer member by an anvil member forces the first end into the groove, and the knurls into the wall of the hole, and upsets the tube to form a plurality of bulges, thereby attaching the fastener to the object.

2. A blind fastener comprising: a tube having a central axis, an axial hole extending from a first end thereof, a first circular cylindrical surface defining at least a portion of the hole, a second circular cylindrical surface defining at least a portion of the outside contour of the tube, said cylindrical surfaces being coaxial around the central axis, at least a portion of the second cylindrical surface being axially aligned with at least a portion of the first cylindrical surface, the aligned portions being continuous and ungrooved, and internal threads in the hole on the opposite side of the first cylindrical surface from the first end, the ratio of length of the axially aligned portions of the cylindrical surfaces, the wall thickness of the tube and the radii of the cylindrical surfaces at the axially aligned portions being such that compressive loading of said tube which is exerted by engaging said threads and pulling the tube toward the first end while opposing movement of the first end, causes the tube to bulge outwardly in at least two axially spaced locations included in the axially aligned portions of the cylindrical surfaces; the exterior surface of the tube and the interior surface of the tube each having a groove therein, said grooves being axially spaced from each other and having their roots radially overlapping, with the groove in the outer surface closer to the first end than the groove in the inner surface, the exterior surface having axial knurls adjacent to its groove on the opposite side thereof from the said first end, the minimum cross-section of the tube wall being disposed between the grooves, whereby the tube will fracture between said grooves upon pulling the tube toward the first end, and whereby the knurled surface at least partially telescopes over the groove in the exterior surface and is expanded.

References Cited by the Examiner

UNITED STATES PATENTS

| 2,324,142 | 7/1943 | Eklund | 85—70 |
| 2,914,106 | 11/1959 | Boyd | 85—70 |
| 2,971,425 | 2/1961 | Blakeley | 85—73 |
| 3,063,329 | 11/1962 | Vaughn | 85—73 |

FOREIGN PATENTS

| 916,981 | 9/1946 | France. |
| 200,616 | 1/1939 | Switzerland. |

CARL W. TOMLIN, *Primary Examiner.*

EDWARD C. ALLEN, *Examiner.*